United States Patent
Chiu et al.

(10) Patent No.: US 8,918,748 B1
(45) Date of Patent: Dec. 23, 2014

(54) M/A FOR PERFORMING AUTOMATIC LATENCY OPTIMIZATION ON SYSTEM DESIGNS FOR IMPLEMENTATION ON PROGRAMMABLE HARDWARE

(75) Inventors: Gordon Raymond Chiu, North York (CA); Deshanand Singh, Mississauga (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/593,665

(22) Filed: Aug. 24, 2012

(51) Int. Cl.
G06F 17/50 (2006.01)

(52) U.S. Cl.
CPC .................................. G06F 17/505 (2013.01)
USPC ........... 716/114; 716/102; 716/108; 716/113; 716/134

(58) Field of Classification Search
USPC .......................... 716/102–104, 106–115, 134
See application file for complete search history.

(56) References Cited

U.S. PATENT DOCUMENTS

| 6,292,926 | B1 * | 9/2001 | Fukui et al. | 716/104 |
| 6,466,066 | B1 * | 10/2002 | Yoshikawa | 327/141 |
| 7,207,024 | B2 * | 4/2007 | Scheffer | 716/114 |
| 8,051,396 | B2 * | 11/2011 | Beerel et al. | 716/104 |
| 8,141,019 | B2 * | 3/2012 | Curtin et al. | 716/119 |
| 8,234,607 | B2 * | 7/2012 | Ekanayake et al. | 716/103 |
| 2003/0149943 | A1 * | 8/2003 | Yoshikawa | 716/1 |
| 2004/0158806 | A1 * | 8/2004 | Scheffer | 716/11 |
| 2005/0055655 | A1 * | 3/2005 | Augsburg et al. | 716/6 |
| 2011/0066986 | A1 * | 3/2011 | Ekanayake et al. | 716/103 |

* cited by examiner

Primary Examiner — Nha Nguyen
(74) Attorney, Agent, or Firm — L. Cho

(57) ABSTRACT

A method for performing latency optimization on a system design to be implemented on a target device includes inserting a variable latency indicator in the system design at a place where latency can be varied. The system design includes pipeline registers at the place where the variable latency indicator is inserted. Latency optimization is then automatically performed on the system design, during a computer aided design flow performed by an electronic Design Automation (EDA) tool, by varying the number of the pipeline registers at the variable latency indicator to obtain optimized latency without affecting system performance of the system design.

20 Claims, 8 Drawing Sheets

M/A FOR PERFORMING AUTOMATIC LATENCY OPTIMIZATION ON SYSTEM DESIGNS FOR IMPLEMENTATION ON PROGRAMMABLE HARDWARE

TECHNICAL FIELD

Embodiments of the present invention relate to electronic design software for programmable hardware. More specifically, embodiments of the present invention relate to a method and apparatus of performing automatic latency optimization on system designs to be implemented on programmable hardware.

BACKGROUND

Field programmable gate arrays (FPGAs) can be programmed to implement large electronic systems. The complexity of such large electronic systems often requires the use of electronic design software such as Electronic Design Automation (EDA) tools to create, define, and verify a system design that is then programmed or implemented on a FPGA or other physical programmable target device.

In order to use an EDA design tool to design such a system on a target device such as an FPGA, a user or a system designer typically first defines, specifies, or models the system design (or user design) in a hardware description language (HDL) such as VHDL (Very high speed integrated circuit HDL) or Verilog. The system design is then entered into the EDA design tool. The EDA design tool then performs computer aided design (CAD) validation and/or verification processes or flows to realize the system design on the target device. Among the procedures performed by EDA tools in a CAD flow are logic and physical synthesis, technology mapping, clustering, placement, and routing.

The system design of the electronic system can also be specified with speed or frequency requirements. For example, a user can specify that the system design is for a memory controller with a maximum clock speed or frequency of 300 MHz while another user can specify the system design is for a memory controller operating at a maximum clock speed or frequency of 160 MHz. To increase the operation speed of the system design to reach the required frequency or speed, pipelining can be employed or introduced into the system design. To do so, the designer can insert pipeline registers into the system design along data paths to obtain more parallel operations.

However, pipeline registers also introduce latency. When a larger number of pipeline registers are used in a system design, a relatively large latency is introduced. One prior art approach of reducing latency is to manually adjust the amount of latency at various stages or places of the system design.

This prior art solution can be difficult, tedious, and time consuming. First, it is very difficult to determine the best locations in the system design to insert new pipeline registers or to remove existing pipeline registers because most user designs have complex control loops which are difficult to pipeline. Secondly, to obtain the best performance/speed and latency tradeoff, the user or human designer needs to repeatedly re-write the system design to explore various pipeline options in the system design. This is both tedious and time consuming. Also, this re-writing approach requires significant effort to develop and verify HDL design changes. Thirdly, modifying pipelining in multiple components within the system design may introduce logic error to the system design or cause undesired functional changes to the system design, and require additional functional verification effort.

SUMMARY

According to an embodiment of the present invention, latency optimization is performed on a system design to be implemented on a target device. In this embodiment, a variable latency indicator is inserted in the system design at a place where latency can be varied. The system design includes pipeline registers at the place where the variable latency indicator is inserted. Latency optimization is then automatically performed on the system design, during a computer aided design flow performed by an EDA tool, by varying the number of the pipeline registers at the variable latency indicator. In one embodiment, the latency optimization is achieved by adding pipeline registers at the variable latency indicator. In another embodiment, the latency optimization is achieved by removing pipeline registers at the variable latency indicator.

According to another embodiment of the present invention, a computer-readable medium includes sequences of instructions which, when executed, cause a processor to perform latency optimization on a system design to be implemented on a target device. In this embodiment, the instructions include instructions to receive user input to insert a variable latency indicator in the system design at a place where latency can be varied. The system design includes pipeline registers at the place where the variable latency indicator is inserted. The instructions also include instructions to determine optimal latency of the system design at the place. The instructions also include instructions to adjust the latency at the place by varying the number of the pipeline registers at the place during a computer aided design flow performed by an EDA tool.

According to yet another embodiment of the present invention, an electronic design automation system includes an engine that includes a design manager, a synthesis unit, a mapping unit, a placement unit, and a routing unit. The electronic design automation system also includes a latency optimization unit that performs latency optimization on a system design to be implemented on a target device. The latency optimization unit receives, via the design manager, the system design with a variable latency indicator inserted at a place in the system design where latency can be varied. The system design includes pipeline registers at the place where the variable latency indicator is inserted. The latency optimization unit automatically performs latency optimization on the system design, during a computer aided design flow performed by the engine, by varying the number of the pipeline registers at the variable latency indicator.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
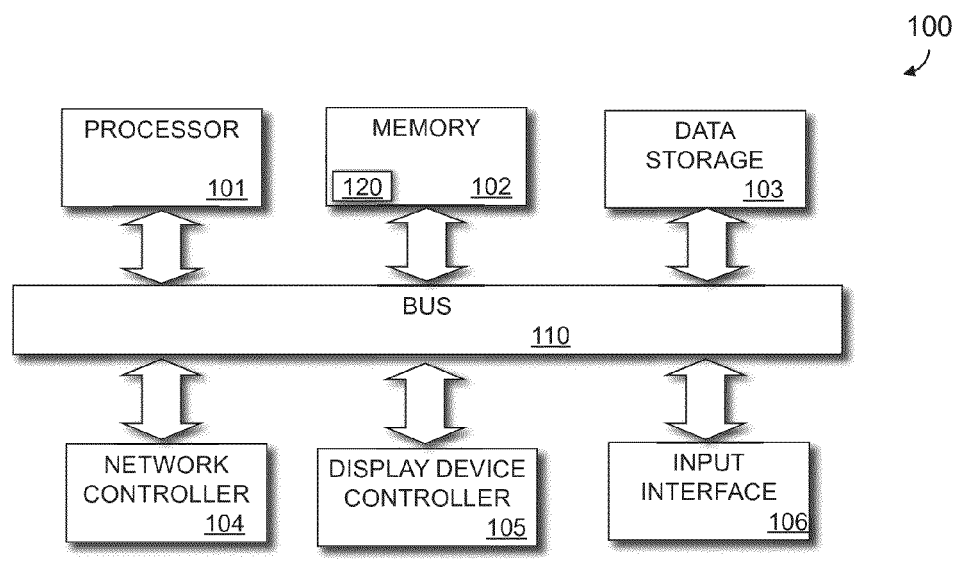
FIG. 1 illustrates a block diagram of a computer system that implements a system designer that performs latency optimization according to one exemplary embodiment of present invention.

FIG. 1 is a block diagram of an exemplary computer system 100 in which an example embodiment of the present invention resides. The computer system 100 may be used to implement a system designer (e.g., system designer 120). The system designer 120 is, in one embodiment, an EDA tool. In this embodiment, the system designer 120 is an electronic design tool to help create, define, and optimize a system design that is then programmed or implemented on an FPGA or other physical programmable target device. The system designer 120 may be implemented in software form residing in a memory 102 of the computer system 100.

According to one embodiment, the system designer 120 includes a variable latency optimization module (shown in FIG. 2) that performs latency optimization on the system design. In this embodiment, variable latency indicators are inserted in the system design at places where latency can be varied. The variable latency optimization module then performs latency optimization at each place that has a variable latency indicator. The variable latency optimization module performs the latency optimization by varying the number of pipeline registers at the variable latency indicator.

In one embodiment, the latency optimization performed by the variable latency optimization module is to obtain optimized or minimum overall system latency of the system design without affecting system performance of the system design. In another embodiment, the latency optimization performed by the variable latency optimization module is to obtain optimized overall system performance (or maximum speed or frequency) of the system design at a given or desired latency.

In one embodiment, the latency optimization is achieved by adding pipeline registers at the variable latency indicator. In another embodiment, the latency optimization is achieved by removing pipeline registers at the variable latency indicator. The variable latency optimization module and its optimization operation in accordance with embodiments of the present invention will be described in more detail in conjunction with FIGS. 1 through 8.

The term latency refers to the time propagated from input of a system, block, or component to its output. The time can be measured in terms of the number of clock cycles times the time period of each clock cycle. Thus, latency can be represented in terms of the number of clock cycles (since the time period for each clock cycle is known), or simple time value.

Referring to FIG. 1, in addition to the memory 102, the computer system 100 includes a processor 101, a bus 110, data storage 103, a network controller 104, a display device controller 105, and an input interface 106. The processor 101 of the computer system 100 executes instructions and processes data. The processor 101 is connected or coupled to the bus 110 that transmits data and instructions between components and modules of the computer system 100. The bus 110 may be a single bus or a combination of multiple buses. The memory 102 of the computer system 100 may be a dynamic random access memory, a static random access memory, and/or other types of memory (e.g., flash memory). The memory 102 may store instructions and code executed by the processor 101. The data storage 103 is coupled or connected to the bus 110. The data storage 103 may be a hard disk drive, a CD-ROM drive, a flash memory device, and/or other types of nonvolatile mass storage devices.

The network controller 104 is coupled or connected to the bus 110. The network controller 104 may link the computer system 100 to a network of computers (not shown) and supports communication among the computers. The display device controller 105 is also coupled or connected to the bus 110. The display device controller 105 allows coupling of a display device (not shown) to the computer system 100 and acts as an interface between the display device and the computer system 100.

The input interface 106 is coupled or connected to the bus 110. The input interface 106 may be, for example, a keyboard and/or cursor control device (e.g., mouse). The input interface 106 may also be a touch screen input interface, in one embodiment. In this case, the display device controller 105 and the input interface 106 may be integrated together as an integrated unit. The input interface 106 allows for input data and instructions to be transmitted from an input device to the computer system 100. It should be appreciated that the computer system 100 may be implemented with different architecture or has more or fewer or different components than those shown in FIG. 1.

As described above, the system designer 120 is implemented in software form residing in the memory 102, according to one embodiment of the present invention. In alternate embodiments, the system designer 120 may be implemented in hardware or with a combination of hardware and software. The system designer 120, in one embodiment, is an EDA electronic design software tool to create, define, and optimize a system design which is then programmed or implemented on a programmable target device. In one embodiment, the target device is a FPGA device. In other embodiments, the target device can be other types of programmable hardware (e.g., ASIC, structured ASIC, or programmable logic device (PLD)).

To design and implement such a system design using the EDA system designer 120, a user or human designer first defines, specifies, or models the system design (or user design). The system design may be described at a gate level or at a more abstract level. This means that the system design may be described in a hardware description language (HDL). In one embodiment, the HDL language employed is the Very high speed integrated circuit HDL (VHDL) language. In another embodiment, the HDL language employed is the Verilog language.

The system design received at the system designer 120 includes initial description of the system to be implemented or realized on the target programmable device. The initial description of the system design describes the logical functional blocks and their interconnectivities of the system. The description may be in the form of a structured netlist created using a programming language, in one embodiment. Alternatively, it may be in the form of a block-based schematic created by the human designer using a graphical user interface tool (not shown). The block based schematic may then be converted into a netlist. The structured netlist describes the components and connectivity of the system design.

Figure 2:
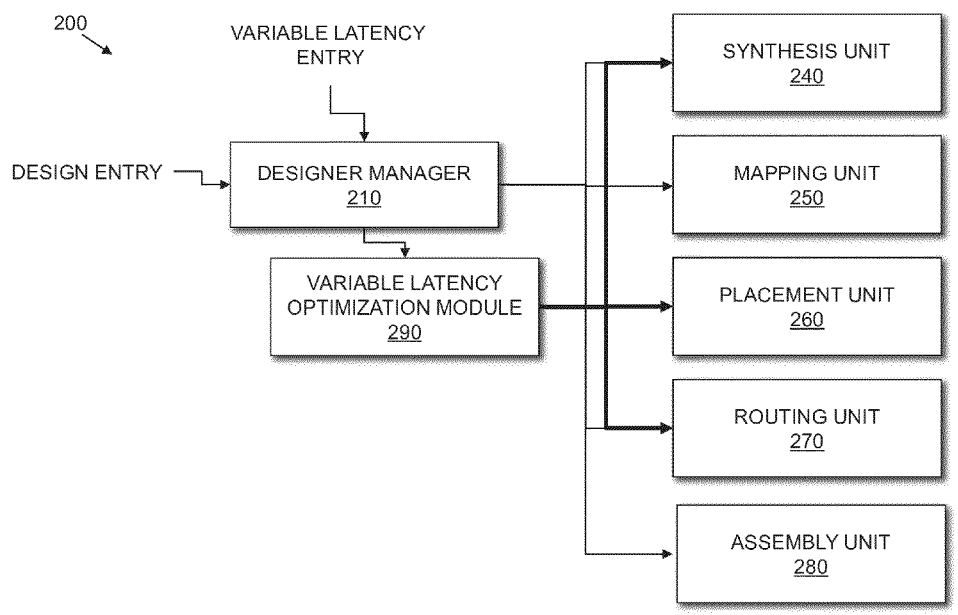
FIG. 2 illustrates a system designer that includes a variable latency optimization module for latency optimization according to an exemplary embodiment of the present invention.

The system design is then received in the system designer 120. The EDA system designer 120 then performs computer aided design (CAD) validation and/or verification procedures or flows to realize the system design on the target device. The system designer 120 then converts or transforms the system design into a circuit description data file that then specifies how the target device is programmed into a system specified by the system design. The data file is then used to control the programming of the target device to realize the system design. Among the procedures performed by system designer 120 in a CAD flow are logic and physical synthesis, technology mapping, clustering, placement, and routing. In addition and in accordance with one embodiment of the present invention, the system designer 120 also performs the latency optimization on the system design in accordance with one embodiment of the present invention FIG. 2 illustrates an embodiment of a system designer 200 according to an embodiment of the present invention. The system designer 200 may be used to implement the system designer 120 described in FIG. 1. The system designer 200 includes a design manager 210, a synthesis unit 240, a mapping unit 250, a placement unit 260, a routing unit 270, an assembly unit 280, and a variable optimization module 290. According to an embodiment of the present invention, the modules and/or units shown in FIG. 2 represent software modules, and the designing function of the system designer 200 may be performed by a computer system such as the computer system 100 of FIG. 1 executing sequences of instructions represented by these modules and/or units shown in FIG. 2. In alternative embodiments, hard-wire circuitry may be used in place or in combination with software instructions to implement some or all of the above mentioned modules and/or units. Thus, embodiments of the present invention are not limited to any specific combination of hardware circuitry and software.

The designer manager 210 is coupled or connected to and transmits data between various modules and/or units of the system designer 200. The designer manager 210 receives the initial description of the system design (also referred to as design entry). The designer manager 210 generates an intermediate representation of the system design from the initial description of the system design. According to one embodiment of the present invention, the initial description of the system design may be provided by a human designer or user. As described above, the initial description of the system design may be at a gate level or at a more abstract level (e.g., HDL, VHDL, Verilog, or Open Computing Language (OpenCL)). The human designer may also use the designer manager 210 to create a structured netlist using a programming language construct supported by the designer manager 210. Alternatively, the human designer may use a graphical user interface tool (not shown) supported by the designer manager 210 to create a block based schematic that may be converted into a netlist. The structured netlist describes the components and connectivity of the system design.

The system design may be specified with target speed or frequency requirements. For example, the system design can be specified to be a memory controller operating at a maximum clock speed or frequency of 300 MHz. To meet the target frequency or performance requirement, pipelining may be introduced into the system design at various places to obtain more parallel operations without changing the functional design of the system. Thus, the system design may include pipeline registers at various places (e.g., data paths) within the system design to implement pipelining. However, each pipeline register introduces latency to the system design.

The synthesis unit 240 performs synthesis by generating a logic design of the system design. In one embodiment, the synthesis unit 240 takes a conceptual abstract level (e.g., HDL, VHDL, Verilog, or OpenCL) design definition and generates an optimized logical representation of the system. The optimized logical representation of the system generated by the synthesis unit 240 may include a representation that has a minimized number of functional blocks and registers, such as logic gates and logic elements, required for the system. Alternatively, the optimized logical representation of the system generated by the synthesis unit 240 may include a representation that has a reduced depth of logic and that generates a lower signal propagation delay. The synthesis unit 240 can be implemented using any known procedure and/or technology. Thus the structure and synthesizing functions of the synthesis unit 240 will not be described in more detail below.

The mapping unit 250 performs technology mapping. The mapping unit 250 determines how to implement the functional blocks and registers in the optimized logic representation utilizing specific resources such as cells on the target device thus creating an optimized "technology-mapped" netlist. The technology-mapped netlist illustrates how the resources (cells) on the target device are utilized to implement the system design. In an embodiment where the target device is an FPGA or PLD, the technology-mapped netlist may include cells such as LABs, registers, memory blocks, DSP blocks, IO elements or other components. The mapping unit 250 can be implemented using any known procedure and/or technology. Thus the structure and mapping functions of the mapping unit 250 will not be described in more detail below.

The placement unit 260 performs placement. The placement unit 260 processes the optimized technology-mapped netlist to produce a placement for each of the functional blocks. The placement unit 260 can be implemented or realized using any known procedure and/or technology. Thus the structure and placement functions of the placement unit 260 will not be described in more detail below.

The routing unit 270 performs routing. The routing unit 270 determines the routing resources on the target device to use to provide interconnection between the components implementing functional blocks and registers of the logic design. The routing unit 270 can be implemented or realized using any known procedure and/or technology. Thus the structure and routing functions of the routing unit 270 will not be described in more detail below.

The assembly unit 280 performs an assembly procedure that creates a circuit description data file of the system design. The circuit description data file may be a bit stream that may be used to program the target device. The circuit description data file describes logics that are then programmed or configured into the programmable target device. The assembly unit 280 may output the data file so that the data file may be stored or alternatively transmitted to a separate machine used to program the target device. It should be appreciated that the assembly unit 280 may also output the circuit description data file in other forms such as on a display device or other medium. The assembly unit 280 can be implemented or realized using any known procedure and/or technology. Thus the structure and assembly functions of the assembly unit 280 will not be described in more detail below.

The system designer 200 may include more units or modules than shown in FIG. 2. For example, the system designer 200 may include a physical synthesis unit that performs physical synthesis. Physical synthesis performs a series of circuit transformations to optimize a circuit in a system such that a delay of a signal in the system is reduced, the area required for implementing the system on the target device is reduced, the power required to operate the system is reduced, to improve the routability of the system, and/or to achieve other goals. Physical synthesis can be between the placement unit 260 and the routing unit 270.

Physical synthesis includes (1) sequential register retiming, (2) combinational re-synthesis, and (3) analyzing solutions and resolving choice netlist. Register retiming is a logic optimization technique for synchronous circuits. This technique moves registers across combinational circuit elements to reduce the length of timing-critical paths. Register retiming is performed on the entire design of the system such that all register retiming solutions are identified. More than one register retiming solution may be generated for each register in the system. A choice netlist is generated to represent the register retiming solutions. The choice netlist includes choice nodes which allow alternative solutions to be represented. Choice nodes allow a portion of the choice netlist for one retiming solution to be used as a part of one or more other retiming solutions. This allows a designer or an EDA tool to efficiently store a plurality of alternative solutions associated with a register without requiring the designer or EDA tool to accept a particular solution.

The combinational re-synthesis technique is performed on the register retiming solutions identified. Combinational re-synthesis operates to modify combinational logic reduce the length of timing-critical paths. Combinational re-synthesis may include procedures such as decomposition (functional decomposition or Shannon's decomposition), Boolean division, and/or other procedures.

The analyzing and resolving choice netlist technique analyzes the combinational re-synthesis solutions generated. Analyzing the combinational re-synthesis solutions includes evaluating the choice netlist which represents a plurality of candidates of alternate implementations of an original netlist with both register retiming and combinational re-synthesis moves. Each unique permutation of the choice node configurations results in a different netlist. Each permutation is a configuration of the choice netlist. All possible configurations are analyzed to determine which one results in the best final netlist. The best final netlist may include the configuration of the choice netlist that yields the highest performance, lowest maximum register-to-register delay, or other characteristic. The best final netlist is then designated as the netlist for the system design. The physical synthesis and its techniques of sequential register retiming, combinational re-synthesis, and analyzing solutions and resolving choice netlist can be implemented using known means and therefore will not be described in more detail below.

The variable latency optimization module 290 is coupled and/or connected to the designer manager 210, the synthesis unit 240, the placement unit 260, and the routing unit 270, according to one embodiment of the present invention. In another embodiment, the variable latency optimization module 290 is integrated in one (or more than one) of the synthesis unit 240, the placement unit 260, and the routing unit 270. In a further embodiment, the variable latency optimization module 290 may be connected or coupled to more or fewer units of the system designer 200 than shown in FIG. 2. In this case, the variable latency optimization module 290 may interact with one, some, or all of the units connected to the module 290.

In one embodiment, the variable latency optimization module 290 optimizes the overall latency of the system design. The variable latency optimization module 290, working in conjunction with the designer manager 210, optimizes the overall latency of the system design by adjusting latency at various places within the system design that are indicated to have some latency tolerance. In doing so, optimal or minimum overall latency of the system design is achieved while the target speed or frequency requirement of the system design can still be met.

In another embodiment, the variable latency optimization module 290 optimizes the overall system performance (or maximum speed or frequency) of the system design at a given or desired latency. The latency insensitive or tolerant places in the system design can be along data paths or buses, or within some functional blocks. They can only be inserted where they do not affect the protocol, and cannot be placed in logic generating handshakes or ACK (acknowledgement) signals (i.e., no cycle-timing dependency). The bus or data path may include two independent channels. These places are identified and represented by the user or human designer during the process of creating the data file (for programming of the target device) of the system design using the system designer 200. The indication or representation is achieved through a new construct or latency indicator, which will be described in more detail below, also in conjunction with the designer manager 210.

As described above, the variable latency optimization module 290 performs latency optimization on the system design by adjusting latency at the places within the system design that are indicated to have some latency tolerance in order to achieve the optimal or minimum overall latency of the system design while still maintaining the speed or frequency requirement of the system design. The variable latency optimization module 290 performs the latency optimization at each of the indicated places within the system design. Depending on the system frequency or performance requirement and the latency tolerance level at the indicated place, this latency adjustment at the indicated place is achieved by either introducing new or removing some of the existing latency at the indicated place to allow for the optimized or minimum overall latency of the system design under the given system frequency requirement. In one embodiment, this is achieved by adding or removing pipeline registers at these places.

This latency optimization in accordance with one embodiment of the present invention involves minimum re-architecture of the system design as it is performed during any one of synthesis, mapping, placement, or routing stages of the system design. It allows for automatic optimization of the system design for minimum latency given a specified performance or frequency requirement. It also allows for human designers to be able to easily manipulate pipeline latency in their system design to study and leverage latency with respect to system performance requirement (i.e., latency/performance tradeoff). It allows human designers to insert latency at various latency tolerant places (or boundaries) within the system design to optimize or minimize the overall latency of the system design under a given system frequency or performance requirement. This also ensures all components in the system design to operate or run at similar speed, thus achieving better overall system performance. This latency optimization process will be described in more detail below, particularly in conjunction with the designer manager 210 and the variable latency optimization module 290.

To allow for the latency optimization of the system design, the designer manager 210 receives variable latency entry from the human designer. The variable latency entry includes variable latency indicators provided by the human designer to indicate various places within the system design where latency can be varied, adjusted or optimized. In one embodiment, the designer manager 210 receives the variable latency entry containing the latency indicators separate from the system design entry. In this case, the human designer can use a graphical user interface supported by the designer manager 210 to enter the variable latency entry in the system design. In another embodiment, the designer manager 210 receives the system design entry together with the variable latency entry. In this case, the human designer marks or inserts the latency indicators in the system design when creating the initial description of the system design.

In one embodiment, each latency indicator is in the form of a variable latency block. In this case, the variable latency block can be instantiated as a special Register Transfer Level (RTL) module. Alternatively, the variable latency block can be instantiated by a high level generation tool, such as Altera's Qsys system integration tool made available by Altera Corporation of San Jose, Calif. or an OpenCL compiler. In another embodiment, the variable latency indicator is implemented in the form of a logic assignment that specifies the amount of latency to be inserted or removed. For example, the assignment can be in the form of a VHDL assignment. In this case, the assignment specifies behavior (i.e., latency) in a comment or program form and the behavior information is then extracted during design automation to allow for latency optimization.

The inputs and outputs of a variable latency block include a variable-width input bus and output bus, connected to the bus of signals or data to be pipelined. In addition, the inputs and outputs of the variable latency block further include register control signals (i.e., clock, enable, clear, etc.) that match the desired control signals of existing registers in the system design. Newly added registers will be created with these control signals. Newly removed registers much match these control signals. The variable latency block includes all required information to adjust latency at the place where the variable latency block is placed.

The above described variable latency block module can be represented as follows.

Begin module variable_latency
    input (WIDTH-1:0) data_in
    output (WIDTH-1:0) data_out
    input clock
    input clock_enable
    input clear
  end module.

Figure 5:
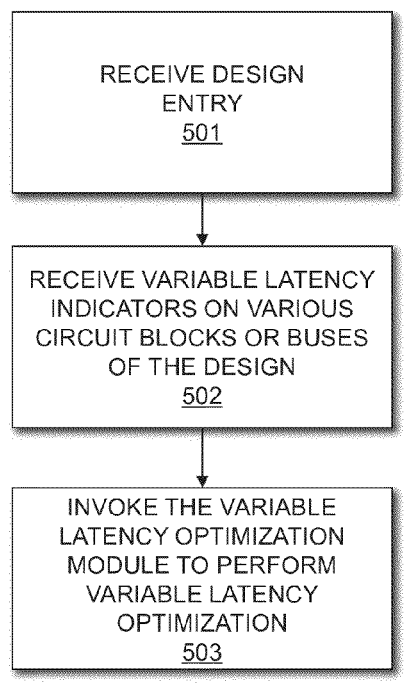
FIG. 5 illustrates the flow or procedure for managing latency optimization of a system design according to an exemplary embodiment of the present invention.

The variable latency indicators can be placed along data paths or buses within the system design that are latency insensitive. At these places within the system design, pipeline registers may be inserted (i.e., added or increased) or removed (i.e., deleted or reduced) without affecting functionality of the system design. When adding a pipeline register at a place or component or block, additional latency is introduced. When removing a pipeline register at the place, the latency is reduced at the place. This allows for latency adjustment at these places to be performed by the latency optimization module 290 to optimize the overall latency of the system design (i.e., latency optimization) without affecting the speed or frequency requirement of the system design. FIG. 5 shows the process flow performed by the design manager 210, which will be described in more detail below.

The designer manager 210 passes the variable latency entry (i.e., latency indicator data) to the variable latency optimization module 290. In one embodiment, the variable latency optimization module 290 optimizes the overall latency of the system design using synthesis procedure or process to add or remove pipeline registers at the places marked with latency indicators. Then the variable latency optimization module 290 employs register retiming and combinational re-synthesis techniques from physical synthesis procedure or process to re-balance timing on paths affected by the change. The variable latency optimization module 290 then reports information about the pipeline latency changes and creates a simulation model for the latency indicator representing the real latency.

In one embodiment, the latency optimization process performed by the variable latency optimization module 290 is a simple iterative optimization process interleaved with timing estimation. The latency optimization module 290 determines whether to add one or more new pipeline registers or to remove one or more of the existing pipeline registers at each of the places where the user has placed a latency indicator. In this embodiment, the latency optimization module 290 first determines whether the required system frequency requirement and timing constraint are met at the places. The latency optimization module 290 performs this determination function by analyzing the system design using some of the functional features or mechanism of the synthesis unit 240. If it is determined that the system frequency requirement is not met by the system design at a place, more pipeline registers need to be added at that place. If it is determined that the system frequency requirement is met by the system design, excessive pipeline registers can be removed to reduce latency at that place. In other words, the user or human designer specifies a frequency or performance constraint for the system design and the variable latency optimization module 290 optimizes the system design to meet this constraint in the minimal latency.

The latency optimization module 290 also determines the number of pipeline registers to be added or removed from the system design at each of the places marked with the latency indicators. There are several ways for determining the number of registers to be added or removed. In one embodiment and when the latency indicator is implemented in the assignment form (i.e., user assignment), the user specifies the number (usually for latency exploration purposes). In another embodiment and when the latency indicator is implemented in the form of variable latency block, the latency optimization module 290 employs an iterative timing-driven process (e.g., adjust by one or by two, etc.) to specify the number.

To remove pipeline registers, the latency optimization module 290 calls or invokes the physical synthesis to retime registers forward (or backward) until one stage of registers reaches the latency indicator (e.g., variable latency block). Retiming automatically checks for legal retiming. Once all signals in the bus have a register available, one stage of registers is removed from all signals in the bus. If one (or more signals) in the bus does not have a register available, then the operation is aborted and restored to the state prior to retiming.

The latency optimization module 290 then performs a retiming (i.e., register retiming) and combinational re-synthesis to achieve post-adjustment optimization. In the case of pipeline registers being removed, the last stage of logic in the design becomes critical if one stage of registers was removed from the output of the design. Then the latency optimization module 290 performs a general retiming through the design to optimize the critical path. In the case of adding pipeline registers, the additional stages of registers can be retimed to improve timing elsewhere in the pipeline.

Figure 3:
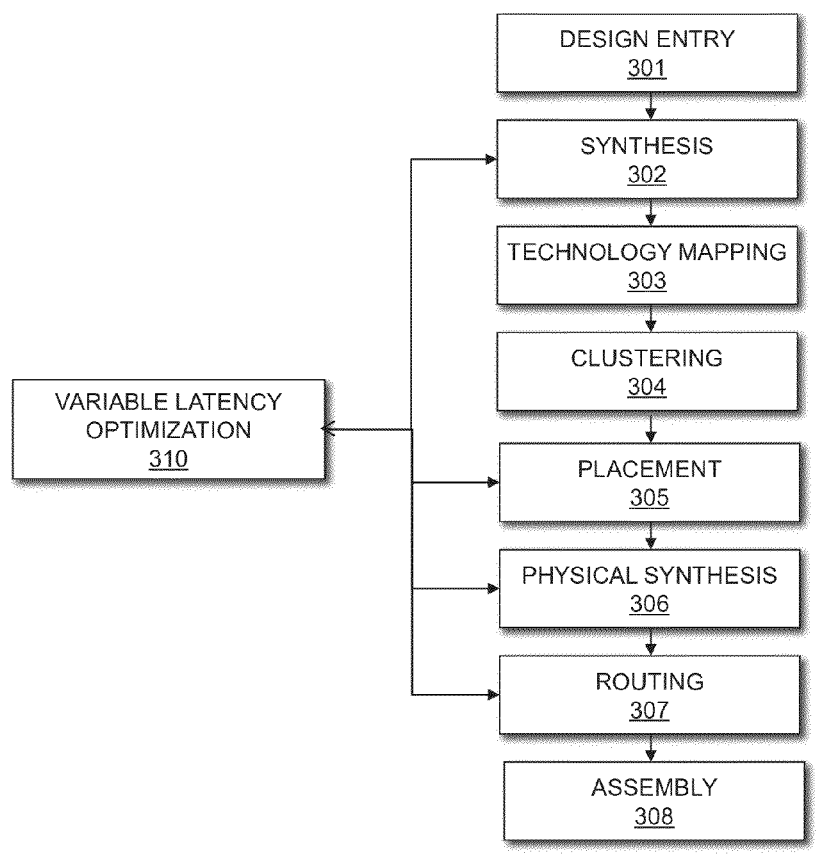
FIG. 3 is a flow chart illustrating a procedure for designing a system on a target device with variable latency optimization according to an exemplary embodiment of the present invention.

FIG. 3 shows in flow chart diagram form a procedure flow of designing a system on a target device with variable latency optimization according to an exemplary embodiment of the present invention. The procedure flow may be performed by an EDA system designer (e.g., the system designer 120 or 200 of FIGS. 1-2). FIG. 3 shows how the variable latency optimization procedure 310 interacts with other procedures of the procedure flow.

As can be seen from FIG. 3, the system design entry is entered or received at 301. In addition, the variable latency entry is also entered or received at 301. As described above, the two entries can be separate or integrated into a single entry.

At 302, the system design is synthesized. Synthesis includes generating a logic design of the system to be implemented. In one embodiment, synthesis generates an optimized logical representation of the system from a HDL design definition. The optimized logical representation of the system may include a representation that has a minimized number of functional blocks and registers, such as logic gates and logic elements, required for the system.

At 303, technology mapping is performed on the optimized logic design. Technology mapping includes determining how to implement logic gates and logic elements in the optimized logic representation with resources available on the target device. The resources available on the target device may be referred to as "cells" or "components" and may include logic-array blocks, registers, memories, digital signal processing blocks, input output elements, and other components. In one embodiment, a netlist is generated from mapping. This netlist may be an optimized technology-mapped netlist generated from the HDL.

At 304, clustering is performed. Clustering may include grouping technology mapped circuit into a set of one or more clusters. The clusters may be implemented with components on the target device such as logic array blocks. Clustering may reduce the size of a design which is to be placed. Synthesis 302, technology mapping 303, and clustering 304 are illustrated in FIG. 3 as three distinct procedures. According to an embodiment of the present invention, technology mapping 303 and clustering 304 may be performed during synthesis 302.

At 305, the mapped logical system design is placed. Placement works on the optimized technology-mapped netlist to produce a placement for each of the functional blocks. Placement includes fitting the system on the target device by determining which components on the logic design are to be used for specific logic elements, and other function blocks.

At 306, physical synthesis is performed. Physical synthesis may be used to perform a series of circuit transformations to optimize a circuit in a system such that a delay of a signal in the system is reduced, the area required for implementing the system on the target device is reduced, the power required to operate the system is reduced, to improve the routability of the system, and/or to achieve other goals. Physical synthesis is shown in FIG. 3 to be performed after placement 305 and before routing 307. It should be appreciated that physical synthesis may also be performed before and after the clustering 304 and placement 305 procedures.

At 307, routing is performed which executes routing algorithms to determine which routing resources should be used to connect the components in the logic design implementing the functional blocks of the system design. During routing, routing resources on the target device are allocated to provide interconnections between logic gates, logic elements, and other components on the target device.

At 308, an assembly procedure is performed. The assembly procedure involves creating a data file that includes information determined by one or more of the procedures 301-308. The data file may be a bit stream that may be used to program the target device.

Back to 301, variable latency optimization procedure 310 will be invoked or called when it is determined that the variable latency entry is also entered at 301. In one embodiment, the variable latency optimization procedure 310 is invoked or called by one of the procedures 302 and 305-307. In another embodiment, the variable latency optimization procedure 310 is invoked or called by some or all of the procedures 302 and 305-307. In yet another embodiment, the variable latency optimization procedure 310 calls or invokes one or more of the procedures 302 and 307-307.

At 310, the system design is optimized for its latency. The variable latency optimization is performed at various places of the system design indicated by the variable latency entry entered or received at block 301 to either add more latency or remove some existing latency at the places to obtain the optimal or minimum overall system latency of the system design. In one embodiment, this variable latency optimization procedure is performed by the variable latency module 290 of FIG. 2. In other embodiments, the variable latency optimization procedure 310 may be performed by other modules or units of the system designer 200 of FIG. 2. The procedure 310 will be described in more detail, also in conjunction with FIGS. 5-8.

Figure 4:
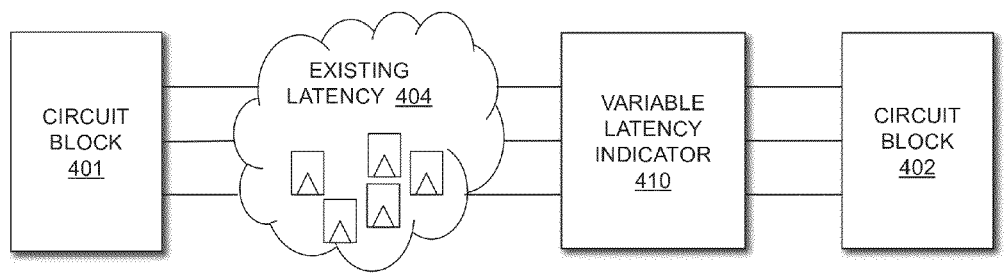
FIG. 4 illustrate a section of a circuit design that includes existing latency and an inserted variable latency indicator that allows for latency optimization by the variable latency optimization module of FIG. 2 in accordance with one embodiment of the present invention.

FIG. 4 illustrate a section of a circuit design of the system design that includes existing latency and an inserted variable latency indicator that allows for latency optimization in accordance with one embodiment of the present invention. As illustrated in FIG. 4, the existing latency is represented by block 404 and the variable latency indicator is represented by block 410. As described above, a user or human designer may insert the variable latency indicator 410 in the circuit design along a data path or bus between two circuit blocks 401 and 402. The latency indicator 410 allows for latency optimization of the system design that includes the circuit design section by either removing some or all of the existing latency 404 or adding or inserting additional latency (both in the form of pipeline registers).

FIG. 5 illustrates the flow or procedure for managing latency optimization of a system design according to an exemplary embodiment of the present invention. In one embodiment, this procedure of managing latency optimization of the system design may be performed by the design manager 210 of FIG. 2. In other embodiment, this procedure of managing latency optimization of the system design may be performed by other modules or units.

As can be seen from FIG. 5, the design entry of the system design is entered or received at 501.

At 502, the variable latency entry is entered or received. As described above, the variable latency entry can be entered or received separate from or together with the system design entry. If the variable latency entry is received or entered together with the system design entry, then 501 and 502 can be combined or integrated into a single procedure.

At 503, a designer manager invokes a variable latency optimization module to perform latency optimization such that the system design can have the optimal or minimized overall system latency at the given system frequency requirement. According to an embodiment of the present invention, design manager 210 (shown in FIG. 2) may invoke variable latency optimization module 290 (shown in FIG. 2) to perform latency optimization.

Figure 6:
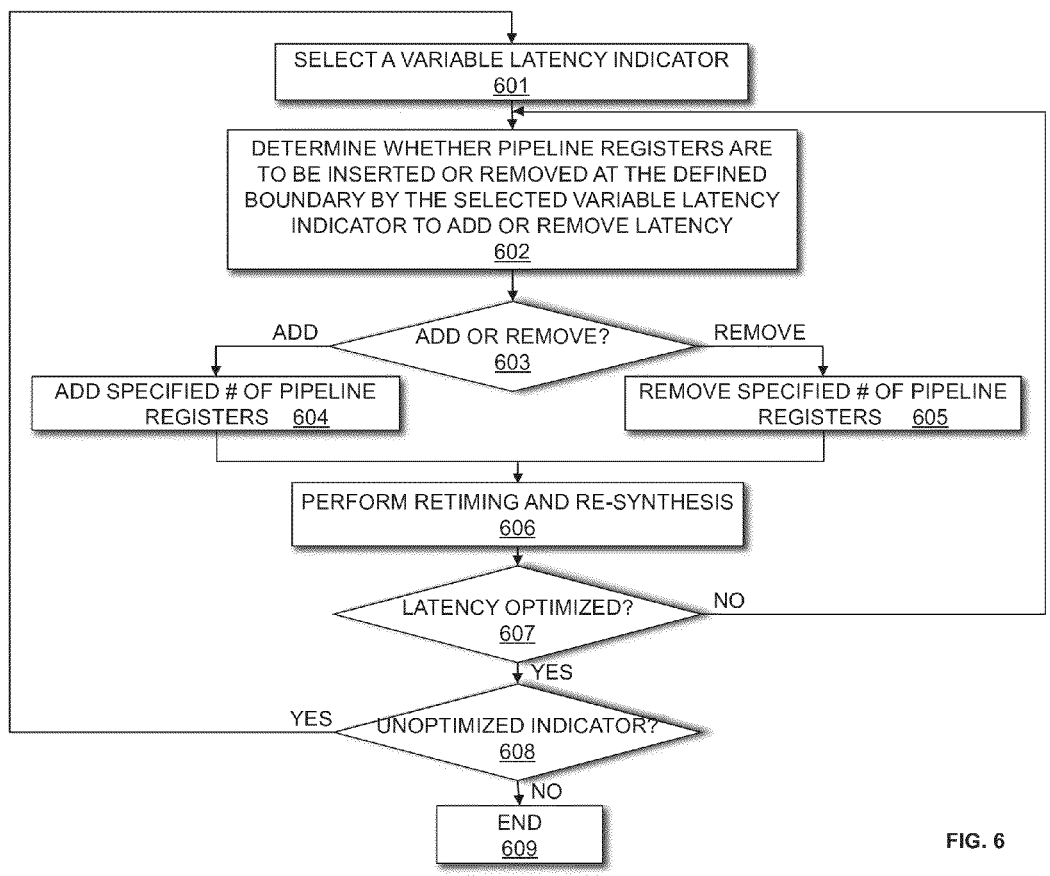
FIG. 6 illustrates the procedure of performing variable latency optimization according to an exemplary embodiment of the present invention, wherein the procedure includes a function of introducing additional latency and a function of removing latency.

FIG. 6 illustrates a procedure of performing variable latency optimization according to an exemplary embodiment of the present invention. The procedure includes a function of introducing additional latency and a function of removing latency. According to one embodiment of the present invention, the procedure shown in FIG. 6 may be performed by the variable latency optimization module 290 of FIG. 2. In one embodiment, the process of FIG. 6 is a simple iterative optimization process that performs latency optimization interleaved with timing estimation.

At 601, a variable latency indicator is selected.

At 602, it is determined whether at the place or boundary indicated by the selected latency indicator latency is to be added (or increased) or reduced (or removed). According to an embodiment of the present invention, block 602 is performed by the latency optimization module 290 of FIG. 2 to determine whether to add one or more new pipeline registers or to remove one or more of the existing pipeline registers. In this embodiment, the latency optimization module 290 of FIG. 2 determines whether the required system frequency requirement and timing constraint are met at the place indicated by the selected latency indicator with the given latency at the place according to one embodiment of the present invention. The latency optimization module 290 of FIG. 2 performs this determination function by analyzing the system design using some of the functional features or mechanism of the synthesis unit 240 of FIG. 2.

Again at 602, if it is determined that the system frequency requirement is not met by the system design, more pipeline registers need to be added. If it is determined that the system frequency requirement is met by the system design, excessive pipeline registers can be removed to reduce latency. In other words, the user or human designer specifies a frequency or performance constraint for the system design and the variable latency optimization module 290 of FIG. 2 optimizes the system design to meet this constraint in the minimal latency.

Again at 602, the number of pipeline registers to be added or removed from the system design is also determined or specified. There are several ways for determining the number of registers to be added or removed. In one embodiment and when the latency indicator is implemented in the assignment form (i.e., user assignment), the user specifies the number (usually for latency exploration purposes). In another embodiment and when the latency indicator is implemented in the form of variable latency block, an iterative timing-driven process (e.g., adjust by one or by two, etc.) to specify the number.

Block 603 branches to either add or remove pipeline registers. If at 603, it is determined to add more pipeline registers, then block 604 is performed. At 604, a specified number of pipeline registers are added to the system design at the place indicated by the selected latency indicator.

If at 603, it is determined to remove a specified number of pipeline registers, then block 605 is performed. At 605, a specified number of pipeline registers are removed from the system design at the place indicated by the selected latency indicator. These pipeline registers are existing registers in the system design. To remove pipeline registers from the system design, a physical synthesis procedure is called or invoked to retime registers forward (or backward) until one stage of registers reaches the variable latency block. Retiming automatically checks for legal retiming. Once all signals in the bus have a register stage available, one stage of registers is removed from all signals in the bus. If one (or more signals) in the bus does not have a register available, then the operation is aborted and restored to the state prior to retiming.

At 606, a retiming and re-synthesis is performed to achieve post-adjustment optimization. This can be done using a synthesis procedure to optimize newly unbalanced path in the system design. In the case of pipeline registers being removed, the last stage of logic in the design becomes critical if one stage of registers was removed from the output of the design. Then the procedure performs a general retiming through the design to optimize the critical path. In the case of adding pipeline registers, the additional stages of registers can be retimed to improve timing elsewhere in the pipeline.

At 607, it is determined if the latency at the place indicated by the latency indicator is optimized. If it is determined that latency is not optimized, control returns to block 602. If it is determined that latency is optimized, control proceeds to 608.

At 608, it is determined whether there remain latency indicators in the system design that have not gone through the latency optimization procedure. If it is determined that a latency indicator in the system design has not gone through the latency optimization procedure, control returns to 601. If it is determined that all latency indicators in the system design have gone through the optimization procedure, control terminates the procedure at 609.

Figure 7:
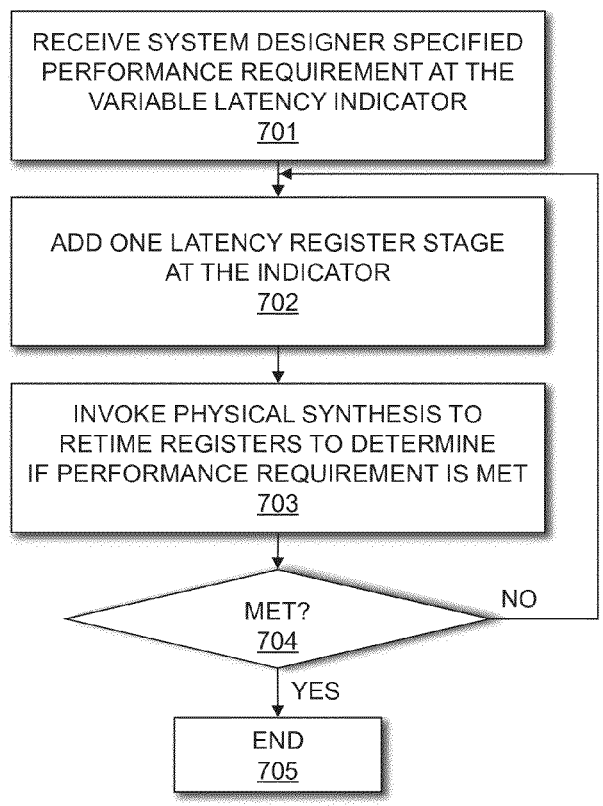
FIG. 7 illustrates a procedure for performing latency addition according to an exemplary embodiment of the present invention.

FIG. 7 illustrates a procedure for performing latency addition according to an embodiment of the present invention. The procedure illustrated in FIG. 7 may be used to implement procedure 604 illustrated in FIG. 6. At 701, the system designer specified performance requirement at the placed marked or indicated by the selected variable latency indicator. This information is used to the system design with the latency change still meets the system performance requirement.

At 702, one latency register stage is added at the place marked or indicated by the latency indicator.

At 703, physical synthesis is invoked to retime registers to determine if the system designer specified performance requirement is still met.

At 704, it is determined whether the designer specified performance requirement is met. If it is determined that the system designer performance requirement is not met, control returns to 702. If it is determined that the system designer performance requirement is met, control terminates the procedure at 705.

Figure 8:
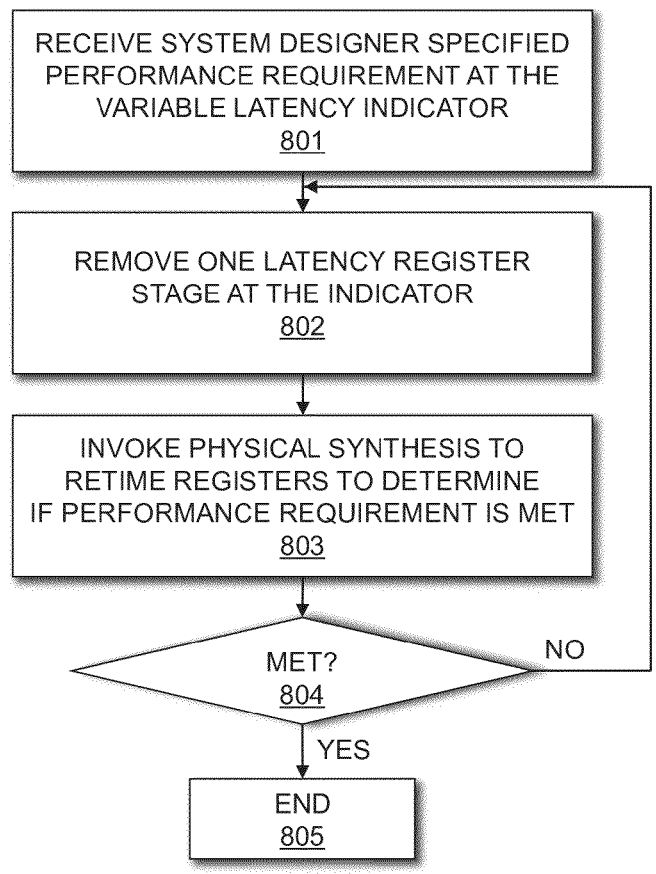
FIG. 8 illustrates a procedure for performing latency removing according to an exemplary embodiment of the present invention.

FIG. 8 illustrates a procedure for performing latency removal according to an embodiment of the present invention. The procedure illustrated in FIG. 8 may be used to implement procedure 605 illustrated in. At 801, the system designer specified performance requirement at the placed marked or indicated by the selected variable latency indicator. This information is used to the system design with the latency change still meets the system performance requirement.

At 802, one latency register stage is removed at the place marked or indicated by the latency indicator.

At 803, physical synthesis is invoked to retime registers to determine if the system designer specified performance requirement is still met.

At 804, it is determined whether the designer specified performance requirement is met. If it is determined that the system designer performance requirement is not met, control returns to 802. If it is determined that the system designer performance requirement is met, control terminates the procedure at 805.

FIGS. 3 and 5-8 are flow charts illustrating methods according to embodiments of the present invention. The techniques illustrated in these figures may be performed sequentially, in parallel or in an order other than what is described. The techniques may be also be performed once or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for performing latency optimization on a system design to be implemented on a target device, the method comprising:
    inserting a variable latency indicator in the system design at a place along a circuit path that includes a plurality of pipeline registers, wherein the variable latency indicator indicates an amount of adjustable latency at its inserted location; and
    automatically performing latency optimization on the system design during a computer aided design flow performed by an electronic Design Automation (EDA) tool by varying a number of the pipeline registers at the variable latency indicator, and performing re-timing and combinational re-synthesis on the system design with adjusted pipeline registers at the variable latency indicator during physical synthesis of the system design, wherein at least one of the inserting and performing is performed by a processor.

2. The method of claim 1, wherein automatically performing latency optimization further comprises adding more pipeline registers at the variable latency indicator to obtain the optimized latency.

3. The method of claim 1, wherein automatically performing latency optimization further comprises removing some of the pipeline registers at the variable latency indicator to obtain the optimized latency.

4. The method of claim 1, wherein automatically performing latency optimization is further performed during synthesis of the system design.

5. The method of claim 1, wherein automatically performing latency optimization is further performed during placement of the system design.

6. The method of claim 1, wherein automatically performing latency optimization is further performed during routing of the system design.

7. The method of claim 1, wherein the variable latency indicator represents possible latency tolerance at the inserted location, wherein the variable latency indicator includes a structure of a Register Transfer Level (RTL) module with inputs and outputs marking bus to be pipelined as well as clock and control signals.

8. The method of claim 7, wherein automatically performing latency optimization is an iterative process that further comprises
    determining a difference between a current latency and an optimized latency;
    adjusting the number of pipeline registers at the variable latency indicator by either adding or removing the pipeline registers at the variable latency indicator based on the determined difference;
    determining if the difference is approximately zero with the adjusted number of pipeline registers; and
    returning to determining the difference if it is determined that the difference is not approximately zero.

9. The method of claim 1, wherein the variable latency indicator is in the form of HDL (High Definition Language) assignments.

10. The method of claim 1, wherein the amount of adjustable latency is specified by a logic assignment made by a user.

11. A non-transitory computer-readable medium having sequences of instructions, the sequences of instructions including instructions which, when executed, cause a processor to perform latency optimization on a system design to be implemented on a target device, further comprising:
    receiving a variable latency indicator placed in the system design at a place along a circuit path that includes a plurality of pipeline registers, wherein the variable latency indicator indicates an amount of adjustable latency at the place;
    determining optimal latency of the system design at the place;
    adjusting the latency at the place by varying the number of the pipeline registers at the place during a computer aided design flow performed by an electronic Design Automation (EDA) tool, and performing re-timing and combinational re-synthesis on the system design with adjusted pipeline registers at the variable latency indicator during physical synthesis of the system design using the EDA tool.

12. The non-transitory computer-readable medium of claim 11, wherein adjusting the latency at the place further comprises adding or removing pipeline registers at the variable latency indicator to obtain the optimized latency.

13. The non-transitory computer-readable medium of claim 11, wherein adjusting the latency at the place is further performed during one of synthesis, placement, and routing of the system design.

14. The non-transitory computer-readable medium of claim 11, wherein the variable latency indicator represents possible latency tolerance at the place of insertion, wherein determining optimal latency is an iterative process that further comprises determining a difference between a current latency and a minimum latency that can be reached at the variable latency indicator without affecting the system performance of the system design;

adjusting the number of pipeline registers at the variable latency indicator by either adding or removing the pipeline registers at the variable latency indicator;

determining if the difference is approximately zero with the adjusted number of pipeline registers; and returning to determining the difference if it is determined that the difference is not approximately zero.

15. The non-transitory computer-readable medium of claim 11, wherein the variable latency indicator is in the form of HDL (High Definition Language) assignments.

16. An electronic design automation system, comprising:
a processor and a memory;
an engine that is stored in the memory and executed by the processor and that includes a design manager, a synthesis unit, a mapping unit, a placement unit, and a routing unit; and
a latency optimization unit that is stored in the memory and executed by the processor and that is operable to perform latency optimization on a system design to be implemented on a target device, wherein the latency optimization unit receives, via the design manager, the system design with a variable latency indicator inserted at a place in the system design along a circuit path that includes a plurality of pipeline registers, wherein the variable latency indicator indicates an amount of adjustable latency at its place, wherein the latency optimization unit automatically performs latency optimization on the system design during a computer aided design flow performed by the engine by varying the number of the pipeline registers at the variable latency indicator, and wherein the latency optimization unit performs re-timing and combinational re-synthesis on the system design with adjusted pipeline registers at the variable latency indicator during physical synthesis of the system design.

17. The electronic design automation system of claim 16, wherein the latency optimization unit automatically performs the latency optimization by
determining a difference between a current latency and a minimum latency that can be reached at the variable latency indicator without affecting system performance of the system design;

adjusting the number of pipeline registers at the variable latency indicator by either adding or removing the pipeline registers at the variable latency indicator;

determining if the difference is approximately zero with the adjusted number of pipeline registers; and returning to determining the difference if it is determined that the difference is not approximately zero.

18. The electronic design automation system of claim 16, wherein the latency optimization unit is further operable to perform the latency optimization during one of synthesis, placement, and routing of the system design.

19. The electronic design automation system of claim 16, wherein the variable latency indicator is operable to represent possible latency tolerance at the place of insertion, wherein the variable latency indicator includes a structure of a Register Transfer Level (RTL) module with inputs and outputs marking bus to be pipelined as well as clock and control signals.

20. The electronic design automation system of claim 16, wherein the variable latency indicator is in the form of HDL (High Definition Language) assignments.

* * * * *